United States Patent
Nakamura et al.

(10) Patent No.: US 11,404,931 B2
(45) Date of Patent: Aug. 2, 2022

(54) DRIVING DEVICE

(71) Applicant: DENSO CORPORATION, Kariya (JP)

(72) Inventors: Ryosuke Nakamura, Kariya (JP); Naohiro Yamamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 98 days.

(21) Appl. No.: 16/855,231

(22) Filed: Apr. 22, 2020

(65) Prior Publication Data
US 2020/0366151 A1    Nov. 19, 2020

(30) Foreign Application Priority Data

May 17, 2019 (JP) .............................. JP2019-093608

(51) Int. Cl.
| | |
|---|---|
| *H02K 5/04* | (2006.01) |
| *H02K 5/10* | (2006.01) |
| *H02K 15/14* | (2006.01) |
| *H02K 5/08* | (2006.01) |
| *F16J 15/14* | (2006.01) |
| *H02K 11/33* | (2016.01) |

(52) U.S. Cl.
CPC ............... *H02K 5/04* (2013.01); *H02K 5/08* (2013.01); *H02K 5/10* (2013.01); *H02K 15/14* (2013.01); *F16J 15/14* (2013.01); *H02K 11/33* (2016.01); *H02K 2211/03* (2013.01)

(58) Field of Classification Search
CPC ............ F16J 15/061; F16J 15/14; H02K 5/04; H02K 5/08; H02K 5/10; H02K 11/33; H02K 15/14; H02K 2211/03; H02K 11/30; H02K 5/225; H02K 11/00; H02K 11/35; H02K 11/38; H02K 5/00; H02K 5/02; H02K 5/12; H05K 5/0052
USPC .................................................. 310/89, 68 R
See application file for complete search history.

(56) References Cited

U.S. PATENT DOCUMENTS

| | | | |
|---|---|---|---|
| 9,723,740 B2* | 8/2017 | Yang ................... | B60R 16/0239 |
| 2012/0320544 A1* | 12/2012 | Ohhashi ................ | H05K 5/062 |
| | | | 361/752 |
| 2014/0085839 A1* | 3/2014 | Nakano ................ | H05K 5/0052 |
| | | | 361/752 |
| 2016/0165736 A1 | 6/2016 | Tsuboi | |

(Continued)

FOREIGN PATENT DOCUMENTS

| | | | |
|---|---|---|---|
| JP | 2004-214529 A | | 7/2004 |
| JP | 2010056493 A | * | 3/2010 |
| JP | 2012227217 A | * | 11/2012 |

(Continued)

OTHER PUBLICATIONS

Kawai et al, Electronic Control Device, Nov. 15, 2012, JP 2012227217 (English Machine Translation) (Year: 2012).*

(Continued)

*Primary Examiner* — Quyen P Leung
*Assistant Examiner* — Alexander A Singh
(74) *Attorney, Agent, or Firm* — Maschoff Brennan (57) ABSTRACT

A driving unit has an adhered recess that is in a loop shape. A cover has an adhered protrusion that is in a loop shape and is opposed to the adhered recess. An adhesive sealing compound adheres the adhered recess and the adhered protrusion to each other continually in a loop shape. A positioning part is configured to position the adhered protrusion relative to the adhered recess.

11 Claims, 6 Drawing Sheets

(56) References Cited

U.S. PATENT DOCUMENTS

2019/0252953 A1    8/2019    Tsuboi et al.

FOREIGN PATENT DOCUMENTS

| JP | 2016-109172 A | 6/2016 |
| JP | 2018-074677 A | 5/2018 |
| JP | 2018-181690 A | 11/2018 |
| KR | 101616578 B1 * | 4/2016 |

OTHER PUBLICATIONS

Park et al, An Actuator for a Vehicle, Apr. 28, 2016, KR 101616578 (English Machine Translation) (Year: 2016).*
Ichikawa et al, Electronic Control Device, Mar. 11, 2010, JP 2010056493 (English Machine Translation) (Year: 2010).*

* cited by examiner

DRIVING DEVICE

CROSS REFERENCE TO RELATED APPLICATION

The present application claims the benefit of priority from Japanese Patent Application No. 2019-093608 filed on May 17, 2019. The entire disclosures of all of the above applications are incorporated herein by reference.

TECHNICAL FIELD

The present disclosure relates to a driving device.

BACKGROUND

JP 2018-181690 A discloses a connector that is assembled by fitting a cover connector to a counterpart connector. The connector includes a preceding guide portion that guides the cover connector in a normal position such that the cover connector can be fitted to the counterpart connector. In addition, the connector is sealed by using a cover seal that is held between a cover seal housing and a hood portion. The entire disclosures of JP 2018-181690 A are incorporated herein by reference.

SUMMARY

According to an aspect of the present disclosure, a driving device comprises a driving unit having an adhered recess that is in a loop shape. The driving device further comprises a cover having an adhered protrusion that is in a loop shape and is opposed to the adhered recess. The driving device further comprises an adhesive sealing compound adhering the adhered recess and the adhered protrusion to each other continually in a loop shape.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, examples of the present disclosure will be described.

As described above, in the structure of JP 2018-181690 A, the components of the connector are fitted to and assembled with each other. In addition, the interior of the connector is sealed by using the cover seal. In other words, the connector includes a part in which the components are fitted to each other and a part that seals the interior, separately. Therefore, a concern arises that even in a case where the fitting may not be carried out properly, the sealing may not be carried out appropriately. According to an example of the present disclosure, a driving device comprises a driving unit having an adhered recess that is in a loop shape. The driving device further comprises a cover having an adhered protrusion that is in a loop shape and is opposed to the adhered recess. The driving device further comprises an adhesive sealing compound adhering the adhered recess and the adhered protrusion to each other continually in a loop shape. The driving device further comprises a positioning part configured to position the adhered protrusion relative to the adhered recess.

The present configuration may enable to provide a driving device that includes components adhered to and sealed to each other appropriately.

Multiple embodiments will be described with reference to the drawings. In each embodiment, the same reference numerals are given to the structures corresponding to and/or related to descriptions functionally and/or structurally in preceding embodiment. To a part of descriptions corresponding and/or related to, description in the other embodiment may be referred.

First Embodiment

A driving device 1 is configured to electrically drive an object and is to be used as a rotary electric device such as a motor device or a power generation device. Alternatively, the driving device 1 may be applied to an actuator device that does not involve a rotary motion. The driving device 1 may be used as, for example, a device included in an electric power steering system equipped in a vehicle. An example, in which the driving device 1 is used as a part of an electric power steering system for a vehicle, will be described below.

Figure 1:
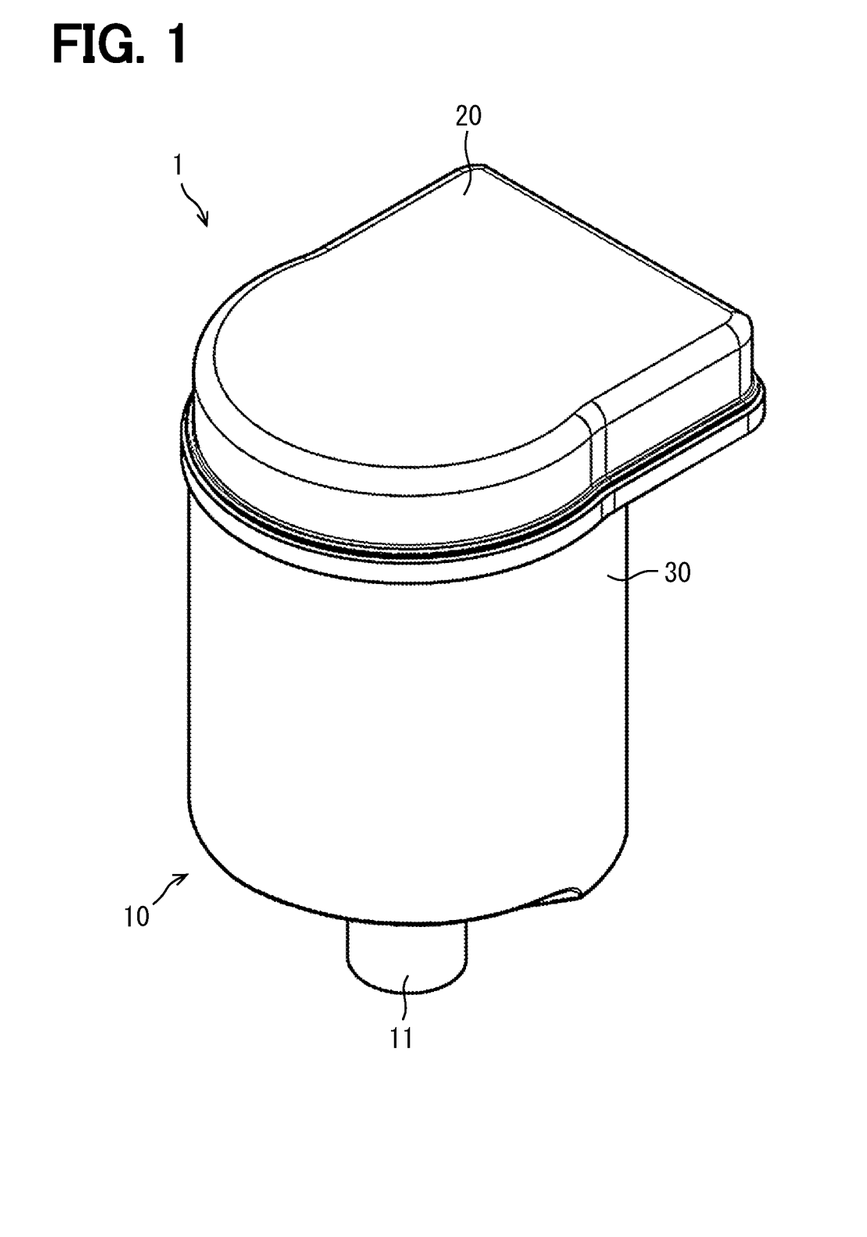
FIG. 1 is a perspective view showing a driving device according to a first embodiment.

In FIG. 1, the driving device 1 includes a driving unit 10 and a cover 20. The driving unit 10 includes a motor 11 and a frame 30. The motor 11 is an electric actuator configured to convert electric energy into a rotary motion. The motor 11 is, as the driving device 1, configured to produce the driving force. Instead of the motor 11, another device such as an actuator or the like may be employed to produce the driving force. The frame 30 has a tubular shape with a bottom. The frame 30 includes a motor case, which is a tubular object, and a frame end which forms the bottom of the frame 30. The frame 30 houses the motor 11 in a storage space that is surrounded by the motor case and the frame end. The frame 30 is made of a metallic material that has high thermal conductivity.

The cover 20 is equipped to the driving unit 10. The cover 20 is a component smaller than the driving unit 10. The cover 20 is lighter than the driving unit 10. The cover 20 is a resin member. The cover 20 is made of resin such as polybutylene terephthalate.

Figure 2:
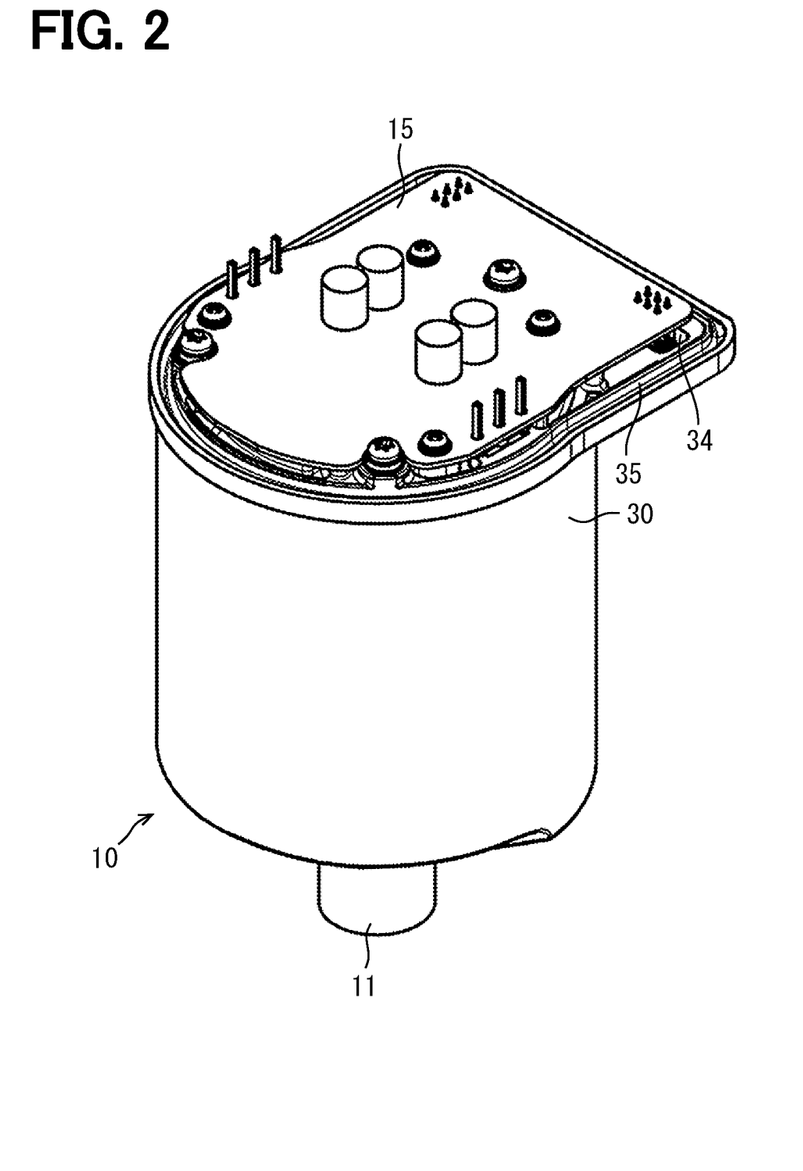
FIG. 2 is a perspective view showing the driving device.

In FIG. 2, the driving unit 10 includes a circuit board 15. The circuit board 15 covers the frame end of the frame 30. An adhered recess 35 is formed in the frame 30. The adhered recess 35 has a continuous loop shape. The adhered recess 35 is formed on the outer side of the circuit board 15 in a radial direction of a rotational axis of the motor 11. Multiple electronic components are mounted on the circuit board 15. One end of a coil of the motor 11 penetrates the circuit board 15 and protrudes to the side opposite from the side on which the motor 11 is placed.

The frame 30 has positioning openings 34 formed on the outside of an projection area to which the circuit board 15 is projected. The positioning openings 34 are openings into which positioning parts 80, which will be described later, are inserted, respectively. The positioning opening 34 are provided correspondingly to the positioning parts 80.

Figure 3:
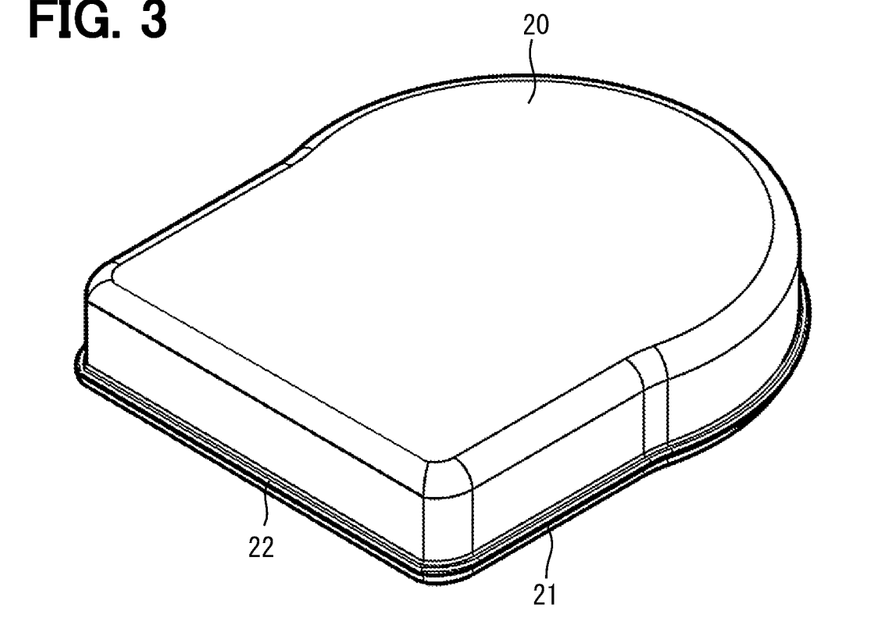
FIG. 3 is a perspective view showing a cover.

In FIG. 3, the cover 20 includes an adhered protrusion 21 and an outer surface protrusion 22. The adhered protrusion 21 protrudes in a direction to be opposed to the frame 30. The adhered protrusion 21 is continuously formed in a loop shape in the entirety of the end of the cover 20. The end of the cover 20 forms an outer peripheral surface of the cover 20. In a vicinity of the adhered protrusion 21, the outer surface protrusion 22 protrudes from an outer surface of the cover 20. A direction in which the adhered protrusion 21 protrudes intersects with a direction in which the outer surface protrusion 22 protrudes. The outer surface protrusion 22 is continuously formed along the outer surface of the cover 20 in a loop shape.

Figure 4:
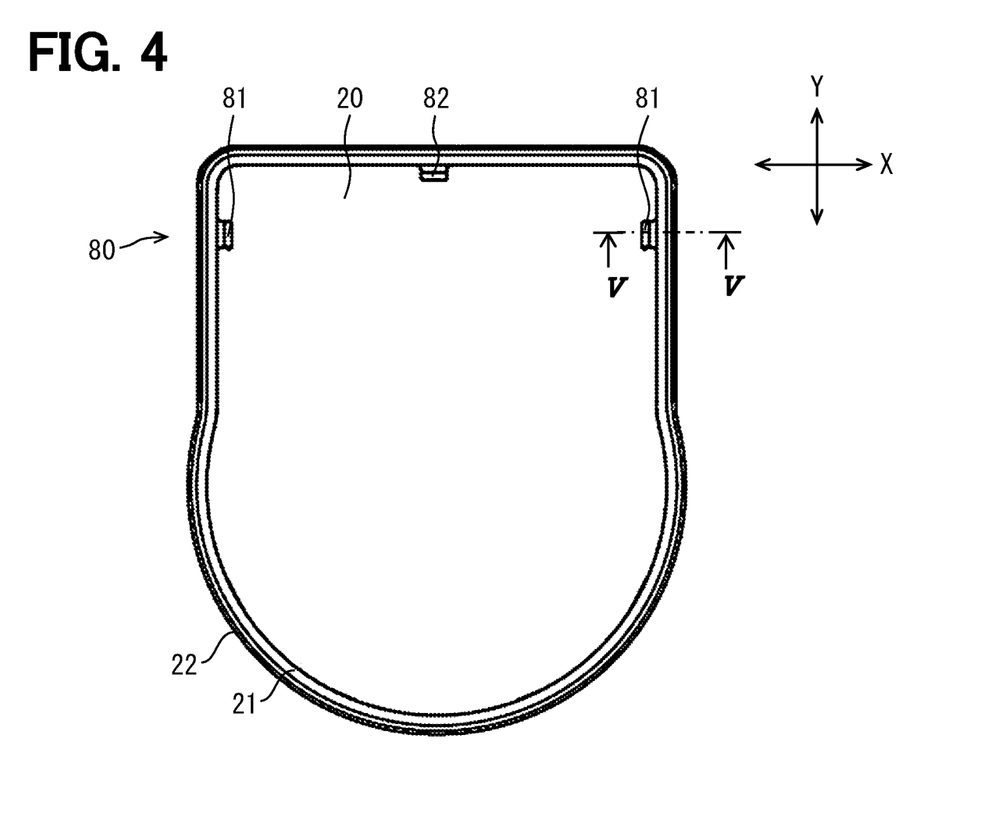
FIG. 4 is a view showing the cover viewed from a lower side.

In FIG. 4, the cover 20 includes the positioning parts 80. The positioning parts 80 are protrusions each of which protrudes in a direction along the direction in which the adhered protrusion 21 protrudes, that is, along a protruding direction of the adhered protrusion 21. The positioning parts 80 are provided on the inner side of the cover 20. In other words, the positioning parts 80 are provided so as not to be exposed to the outside when the cover 20 is mounted on the driving unit 10 appropriately. The positioning parts 80 are provided to a flat surface part of the cover 20 in which the cover 20 has a planar shape and is not provided to a curved surface part of the cover 20 in which the cover 20 has a curved surface shape.

The positioning parts 80 includes two kinds of protrusions including first positioning parts 81 and a second positioning part 82. The first positioning parts 81 includes two protrusions opposed to each other. The second positioning part 82 is placed at a position at which distances from the two protrusions of the first positioning part 81 to the second positioning part 82 are approximately the same as each other. That is, the positioning parts 80 include the three protrusions. The positioning parts 80, as a whole, are placed so as to form an isosceles triangle when entirety of the positioning parts 80 are viewed in the plane of FIG. 4.

The positioning parts 80 are the protrusions that enable to position the cover 20 at an appropriate position relative to the driving unit 10. The first positioning parts 81 are the protrusions that are to position the cover 20 in an X direction. On the other hand, the second positioning part 82 is the protrusion that is to position the cover 20 in a Y direction. Herein, the X direction and the Y direction are on a virtual plane that is orthogonal to the protruding direction of the adhered protrusion 21. In addition, the X direction is orthogonal to the Y direction. In other words, three directions, which consist of the protruding direction of the adhered protrusion 21, the X direction, and the Y direction are in a relation such that the three directions form an orthogonal coordinate system. The X direction is along a flat surface part of the cover 20 to which the second positioning part 82 is provided. In addition, the X direction is a tangential direction of a curved surface part that is placed on the side opposite from the flat surface part to which the second positioning part 82 is provided. The Y direction is along the flat surface part of the cover 20 to which the first positioning parts 81 are placed. It is noted that the X direction and the Y direction may not have the relationship with respect to the flat surface part and the curved surface part of the cover 20 as described above. For example, the X direction may be set to be orthogonal to the protruding direction of the adhered protrusion 21 and may be from a corner part of the cover 20 and intersect with a central axis of the cover 20. In this case, the Y direction is orthogonal to the protruding direction of the adhered protrusion 21 and is orthogonal to the X direction. It is noted that the first positioning part 81 may include one protrusion, not the two protrusions. The X axis is an example of one direction, and the Y direction an example of another direction in the orthogonal coordinate system.

Figure 5:
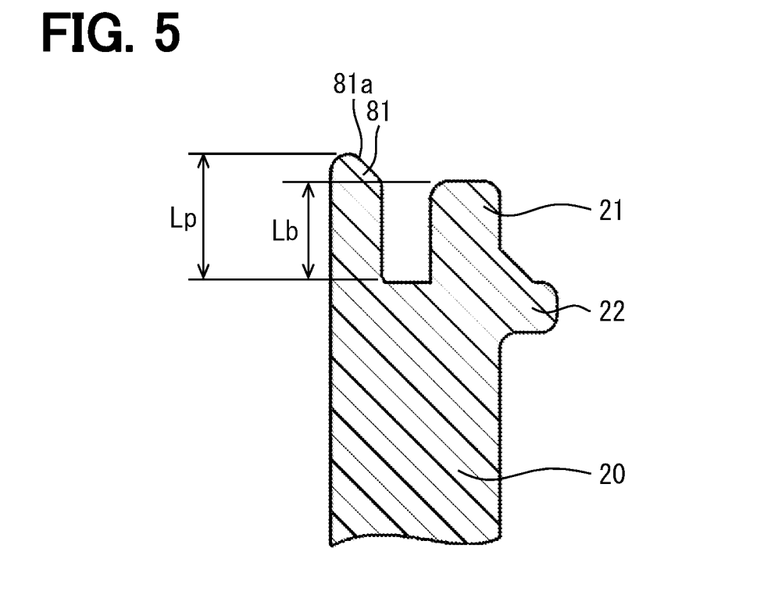
FIG. 5 is a sectional view taken along a line V-V in FIG. 4.

In FIG. 5, the protruding direction of the adhered protrusion 21 is a vertical direction in a plane in FIG. 5. The X direction is a horizontal direction in the plane in FIG. 5. The Y direction is a direction orthogonal to the plane in FIG. 5. An end of the first positioning part 81 is distant from an end of the adhered protrusion 21. When the cover 20 is mounted on the driving unit 10, a part of the adhered recess 35 of the frame 30 is inserted into a clearance between the adhered protrusion 21 and the first positioning part 81.

The end of the first positioning part 81 is an inclined part 81a. The farther away from the adhered protrusion 21, the larger a protrusion amount of the inclined part 81a. The inclined part 81a is formed by implementing a tapering process such that a slope surface of the inclined part 81a becomes a flat surface. It is noted that, a method to form the inclined part 81a is not limited to the tapering process. The inclined part 81a may be formed by implementing a corner process. In case of the corner process, the slope surface of the inclined part 81a becomes a smooth curved surface. A process, which is similar to the process to form the inclined part 81a of the first positioning part 81, is implemented at the second positioning part 82. Because of this, the second positioning part 82 has a shape in which an end of the second positioning part 82 is inclined.

A protrusion amount Lp of the first positioning part 81 is larger than a protrusion amount Lb of the adhered protrusion 21. Protrusion amounts of portions included in the positioning part 80 except for the first positioning part 81 are equal to the protrusion amount Lp of the first positioning part 81. In addition, the protrusion amount of the adhered protrusion 21 is constant irrespective of the position. That is, the protrusion amount Lp of the positioning part 80 is larger than the protrusion amount Lb of the adhered protrusion 21.

Figure 6:
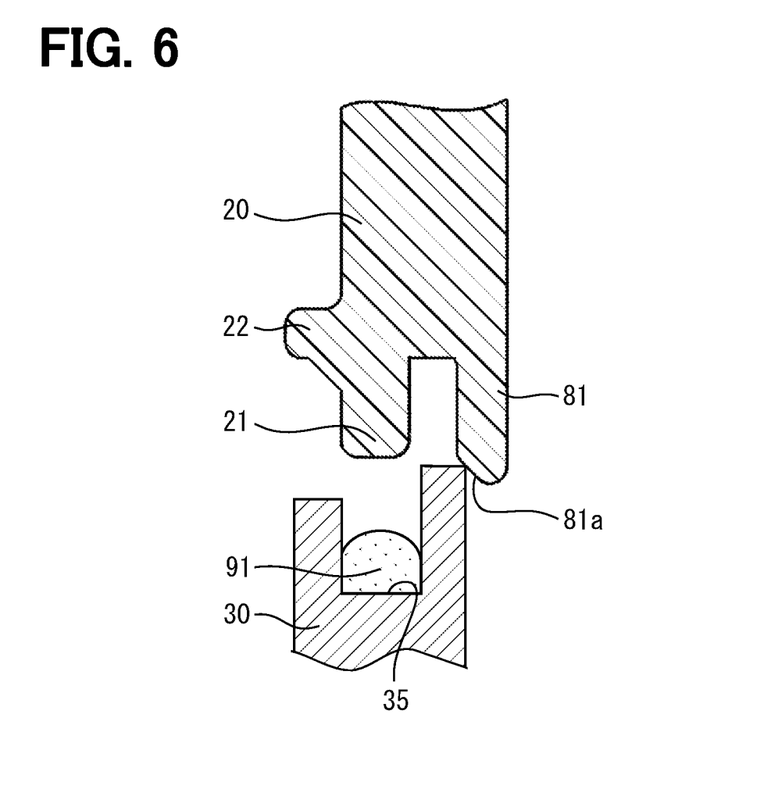
FIG. 6 is an explanatory view showing a state in positioning of a frame and the cover.

An adhesive process included in a manufacturing process of the driving device 1 will be described below. In the adhesive process, an adhesive sealing compound 91 is used. FIG. 6 shows a state before the cover 20 is positioned relative to the driving unit 10. The adhesive sealing compound 91 is provided in the adhered recess 35 in which three sides are surrounded. At this time, the adhesive sealing compound 91 is in a soft state before the adhesive sealing compound 91 is solidified.

The adhesive sealing compound 91 is, for example, silicone-based adhesive. It is noted that, the adhesive sealing compound 91 is not limited to the silicone-based adhesive. It is noted that the adhesive sealing compound 91 may be another material that has an adhering property to fix components, which are adhered to each other, has and a sealing property to restrict foreign matter such as water from entering through a portion at which the components are adhered to each other. For example, acrylic adhesive, epoxy based adhesive or the like may be used as the adhesive sealing compound 91.

When the cover 20 is mounted to the frame 30, the cover 20 is moved toward the frame 30 while a state where the adhered protrusion 21 is opposed to the adhered recess 35 is maintained. In FIG. 6, the cover 20 is slightly displaced from an appropriate position toward an inner side of the cover 20, and therefore the inclined part 81a is in contact with the frame 30. However, as the adhered protrusion 21 is further moved toward the adhered recess 35 while the inclined part 81a is kept in contact with the frame 30, the inclined part 81a guides the position of the cover 20 to be in the appropriate position. In other words, the inclined part 81a functions as a guide part configured to guide the cover 20 to the appropriate position. Herein, as described above, the protrusion amount Lp of the positioning part 80 is larger than the protrusion amount Lb of the adhered protrusion 21. Therefore, while the cover 20 is guided to the appropriate position, the adhered protrusion 21 is not in contact with the frame 30. Therefore, the guide function of the inclined part 81a is not interfered by other parts such as the adhered protrusion 21.

Figure 7:
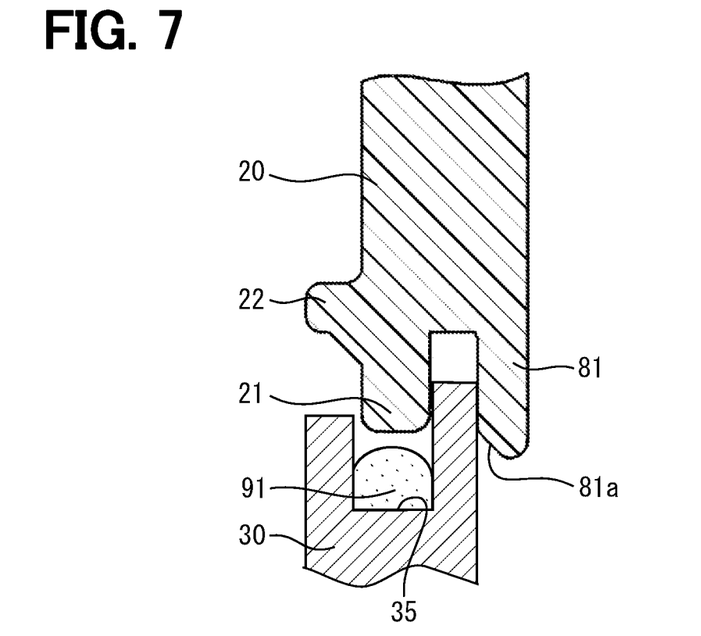
FIG. 7 is an explanatory view showing a state that is before an adhered protrusion and an adhered recess are adhered to each other and that is after the positioning of the cover.

FIG. 7 shows a state after the cover 20 is positioned relative to the driving unit 10 and before the adhered protrusion 21 is adhered to the adhered recess 35. In FIG. 7, the adhered protrusion 21 becomes further closer to the adhered recess 35 than those in the state in FIG. 6, and a part of the adhered protrusion 21 is inserted into the adhered recess 35. A direction in which the adhered protrusion 21 is inserted into the adhered recess 35 is a direction, referred to as an attachment direction of the cover 20 hereinafter, in which the cover 20 is attached. In other words, the protruding direction of the adhered protrusion 21 is the same as the attachment direction of the cover 20.

In FIG. 7, a part of the frame 30 is inserted into a clearance between the first positioning part 81 and the adhered protrusion 21. At this point, a part of the frame 30 is in contact with the positioning part 81 and the adhered protrusion 21 and is interposed between the first positioning part 81 and the adhered protrusion 21. In other words, the cover 20 is unable to move in a direction which intersects with the direction attachment direction in which the cover 20 is attached to the frame 30.

Subsequently, the cover 20 is further moved in the attachment direction of the cover 20 beyond a position at which the adhered protrusion 21 is brought into contact with the adhesive sealing compound 91. Because of this, the adhesive sealing compound 91 is pressed and expanded by the adhered protrusion 21 to spread entirely in the gap and corners. Therefore, even in a case where the adhesive sealing compound 91 is applied discontinuously to the adhered recess 35 before the adhered protrusion 21 is brought into contact with the adhesive sealing compound 91, the adhesive sealing compound 91 is to be continuously spread in the loop shape by being pressed and expanded by the adhered protrusion 21.

The adhered protrusion 21 is kept in contact to a surface of the adhered recess 35, which is placed closer to the center of the driving device 1, by the first positioning part 81. In other words, a part of the frame 30 is pinched and held between the adhered protrusion 21 and the first positioning part 81. Thus, the adhered protrusion 21 and the adhered recess 35 are positioned relative to each other. In this state, the surfaces of the adhered protrusion 21 and the adhered recess 35, which are opposed to each other and are placed on the side closer to the center of the driving device 1, do not therebetween form a space, into which the adhesive sealing compound 91 would flow. On the other hand, the surfaces of the adhered protrusion 21 and the adhered recess 35, which are opposed to each other and placed on the side farther from the center of the driving device 1, therebetween form a space into which the adhesive sealing compound 91 is enabled to flow. The adhesive sealing compound 91, which is pressed and expanded by the adhered protrusion 21, is therefore moved in a direction away from the center of the driving device 1 and to approach the exterior surface of the driving device 1.

Figure 8:
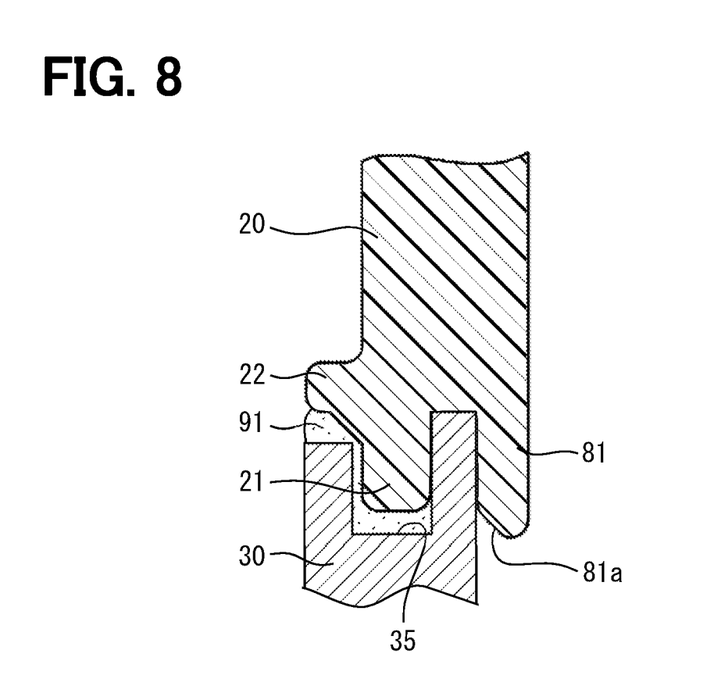
FIG. 8 is an explanatory view showing a state that is after the adhered protrusion and the adhered recess are adhered to each other subsequent to the positioning of the cover.

FIG. 8 shows a state after the adhered protrusion 21 and the adhered recess 35 are adhered and fixed to each other. The adhesive sealing compound 91 is in contact to two components including the cover 20 and the frame 30. The cover 20 and the frame 30 are adhered and fixed to each other via the adhesive sealing compound 91. At this point, the adhesive sealing compound 91 is solidified in a state where the adhesive sealing compound 91 is continuously provided in the loop shape between the adhered protrusion 21 and the adhered recess 35. In other words, the adhesive sealing compound 91 is filled without a gap in the space between the adhered protrusion 21 and the adhered recess 35.

The adhesive sealing compound 91 in the state before being solidified is expanded such that the adhesive sealing compound 91 fills the space between the adhered protrusion 21 and the adhered recess 35 and reaches the outer surface protrusion 22. The adhesive sealing compound 91, which reaches the outer surface protrusion 22, is unable to move further on the outer surface of the cover 20 in the attachment direction. Therefore, the adhesive sealing compound 91 is guided by the outer surface protrusion 22 to be expanded in the direction that intersects with the attachment direction.

The outer surface protrusion 22 is opposed to the end of the frame 30 in the attachment direction. A part of the adhesive sealing compound 91 is placed in the space through which the outer surface protrusion 22 is opposed to the frame 30. In other words, a part of the adhesive sealing compound 91 adheres the outer surface protrusion 22 to the frame 30. That is, an adhesive surface can be ensured that is larger than an adhesive surface in a configuration in which the outer surface protrusion 22 is not provided.

In a case where the adhesive sealing compound 91 is continually provided in the loop shape between the outer surface protrusion 22 and the frame 30 at the exterior surface of the driving device 1, the driving unit 10 and the cover 20 are adhered and fixed to each other via the adhesive sealing compound 91 appropriately. In this state, entry of the foreign matter into the inside of the driving device 1 through the clearance between the adhered protrusion 21 and the adhered recess 35 is restricted. In other words, after completing the adhesive process, whether or not the components are adhered to each other appropriately can be confirmed by confirming whether or not the adhesive sealing compound 91 is continuously provided in the loop shape between the outer surface protrusion 22 and the frame 30. In this case, an opaque adhesive may be used as the adhesive sealing compound 91. In addition, the adhesive sealing compound 91 may have a color different from that of the cover 20 or that of the frame 30. The present configuration enables to confirm whether or not the adhesive sealing compound 91 is exposed to the outside easily by visual observation.

The outer surface protrusion 22, which protrudes from the outer surface of the cover 20 such as a roof, provides a protection function so as to protect the adhesive sealing compound 91 from impact from the outside. For example, in a case where a small stone or the like would collide with the adhesive sealing compound 91 exposed to the outside of the driving device 1, the outer surface protrusion 22 collides with the small stone thereby to protect the adhesive sealing compound 91 from direct collision with the small stone. The present configuration enables to avoid a case, in which the adhesive sealing compound 91 is peeled off the cover 20 or the frame 30, to avoid a case, in which a crack is formed in the adhesive sealing compound 91, and the like, due to the impact imposed from the outside. Therefore, the present configuration enables the adhesive sealing compound 91 to exhibit the two functions including the adhesion function, which is to adhere and fix the components to each other, and the sealing function, which is to restrict the foreign matter from entering into the driving device 1, stably for a long period. Especially in a case where the driving device 1 is equipped in the vehicle, the driving device 1 tends to be brought into contact with the small stone or the like during the vehicle travels. Therefore, the structure that protects the adhesive sealing compound 91 from the collision with a small stone or the like is greatly advantageous when the driving device 1 is used for the vehicle.

In the embodiment described above, the driving device 1 includes the positioning part 80 configured to position the adhered protrusion 21 relative to the adhered recess 35. Therefore, this configuration enables to maintain the position of the adhered recess 35 relative to the position of the adhered protrusion 21 appropriately. This configuration therefore enables to easily adhere and fix the cover 20 to the adhesive sealing compound 91 at its appropriate position. That is, the present configuration enables to produce the driving device 1 including the components which are adhered and sealed to each other appropriately.

In addition, in the fixing by using the adhesive sealing compound 91, the driving unit 10 is not fixed to the cover 20 until the adhesive sealing compound 91 is solidified. Therefore, the present configuration is significant in that the present configuration enables the positioning of the cover 20 such that the position of the cover 20 is not displaced until the adhesive sealing compound 91 is solidified.

The adhered recess 35 and the adhered protrusion 21 are adhered to each other via the adhesive sealing compound 91. Therefore, the present configuration enables to ensure the adhesive surface that is larger than the adhesive surface in a case where a protrusion and a recess are not formed on the adhesive surface. In addition, the present configuration enables the adhesive sealing compound 91 to flow into the clearance between the adhered recess 35 and the adhered protrusion 21 and to adhere the adhered recess 35 to the adhered protrusion 21. Therefore, the positioning of the adhered recess 35 relative to the adhered protrusion 21 appropriately by using the positioning part 80 enables to adjust the position, which is adhered with of the adhesive sealing compound 91, and to adjust the thickness of the adhesive sealing compound 91. For example, the present configuration enables to easily make a distribution of the thickness of the adhesive sealing compound 91 uniform throughout the whole circumference.

The positioning part 80 includes the first positioning part 81 configured to position the cover 20 in the X direction and the second positioning part 82 configured to position the cover 20 in the Y direction. The present configuration enables to position the cover 20 in both the X direction and the Y direction, thereby to enable to restrict displacement of the cover 20 in a direction other than the attachment direction. Therefore, the present configuration enables to adjust the distance between the adhered recess 35 and the adhered protrusion 21 in both the X direction and the Y direction. That is, the present configuration enables to facilitate adjustment of the thickness of the adhesive sealing compound 91 via which the driving unit 10 is adhered to the cover 20 appropriately.

The adhesive sealing compound 91 is continuously provided in the loop shape between the adhered recess 35 and the adhered protrusion 21. The present configuration enables the adhesive sealing compound 91 to restrict foreign matter from entering through the clearance between the adhered recess 35 and the adhered protrusion 21. Therefore, the adhesive sealing compound 91 enables to exhibit the two functions including the adhesion function, which is to adhere and fix the components to each other, and the sealing function to restrict the foreign matter from entering into the clearance between the components.

The protrusion amount Lp of the positioning part 80 is larger than the protrusion amount Lb of the adhered protrusion 21. In the present configuration, when the cover 20 is attached to the driving unit 10, the positioning part 80 tends to be brought into contact with the driving unit 10 before the adhered protrusion 21 is brought into contact with the driving unit 10. Therefore, the present configuration enables the adhered protrusion 21 to be inserted into the adhered recess 35 in a state where the positioning part 80 positions the cover 20 relative to the driving unit 10 appropriately. The present configuration therefore enables the cover 20 to be brought into contact with the driving unit 10 smoothly.

The cover 20 pinches and holds a part of the frame 30 between the adhered protrusion 21 and the first positioning part 81. The present configuration therefore enables to restrict the position of the adhered protrusion 21 with respect to the adhered recess 35 from being displaced easily, even in a case where external force is applied thereto in the direction which intersects with the attachment direction. Therefore, even when the external force is applied, the adhesive sealing compound 91 is protected from being peeled off. That is, the present configuration enables to maintain the state in which the cover 20 is in contact to the driving unit 10 appropriately and stably.

The positioning part 80 includes the inclined part 81a in which the farther from the adhered protrusion 21, the larger the protrusion amount of the inclined part 81a is. The present configuration enables to guide the position of the cover 20 along the inclined part 81a when the cover 20 is adhered with the driving unit 10 after the end of the positioning part 80 is brought into contact with the frame 30. Therefore, the adhered protrusion 21 can be inserted into the adhered recess 35 smoothly.

The cover 20 includes the outer surface protrusion 22 which protrudes from the outer surface of the cover 20 and is opposed to the end of the driving unit 10. The present configuration enables the outer surface protrusion 22 to restrict the adhesive sealing compound 91 from overflowing though the clearance between the adhered recess 35 and the adhered protrusion 21 and from being expanded along the outer surface of the cover 20. That is, the present configuration enables to regulate the position of the adhesive sealing compound 91 that is exposed to the outside. The present configuration enables to confirm the portion of the adhesive sealing compound 91 that is exposed to the outside, thereby to enable to easily confirm whether or not the adhesive sealing compound 91 is spread over the whole circumference.

In addition, the outer surface protrusion 22 exhibits a protection function so as to protect the adhesive sealing compound 91 from impact from the outside. The present configuration enables to protect the adhesive sealing compound 91 from being peeled from the driving unit 10 and the cover 20. Therefore, the present configuration enables the adhesive sealing compound 91 to exhibit the adhesion function and the sealing function stably for the long period.

The adhesive sealing compound 91 enables to adhere a part of the outer surface protrusion 22 to the end of the frame 30. That is, the present configuration enables to ensure the adhesive surface of the adhesive sealing compound 91 to be larger than that in the case in which the outer surface protrusion 22 is not provided. Therefore, the present configuration enables to easily maintain the state in which the driving unit 10 and the cover 20 are adhered and sealed to each other appropriately.

The adhesive sealing compound 91 is opaque. The present configuration facilitates confirmation of the adhesive sealing compound 91 exposed to the outside by the visual observation. Therefore, the present configuration enables to confirm whether or not the driving unit 10 and the cover 20 are adhered and sealed to each other by using the adhesive sealing compound 91 appropriately and smoothly.

In the configuration where the cover 20 is a resin component, a volume change rate due to a temperature change tends to be larger than that in a configuration where the cover 20 is a metal component. Because of this, in a case where the thickness of the sealing compound which adheres to the resin component is excessively thin, the sealing compound may be broken or peeled off due to influence of expansion or contraction of the cover 20 caused by the temperature change. Therefore, adjustment of the thickness of the sealing compound appropriately by using the positioning part 80 is significant. In particular, in the case where the driving device 1 is equipped in the vehicle, temperature of the driving device 1 may vary greatly, Therefore, the configuration that enables to maintain the state where the cover is appropriately adhered is significantly advantageous in the case where the driving device 1 is applied to a vehicle utility.

Second Embodiment

A present second embodiment is a modification of the preceding embodiment. In the present embodiment, second positioning parts 282 include two protrusions opposed to each other.

Figure 9:
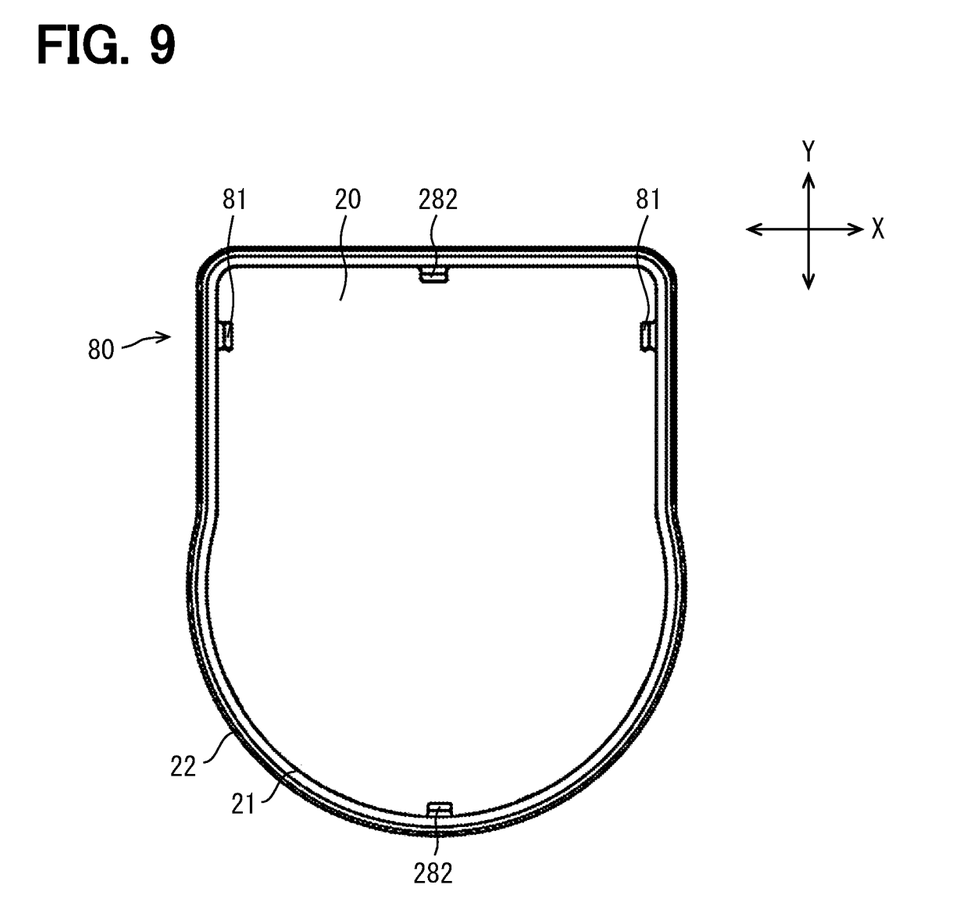
FIG. 9 is a view showing a cover viewed from a lower side according to a second embodiment.

As shown in FIG. 9, the second positioning parts 282 include the two protrusions placed at positions opposed to each other. The second positioning parts 282 are protrusions to position the cover 20 in the Y direction. One of the protrusions of the second positioning parts 282 is provided to the flat surface part of t cover 20. The other of the protrusions of the second positioning parts 282 is provided to the curved surface part. The distance between the second positioning parts 282 is larger than the distance between the first positioning parts 81.

According to the present embodiment as described above, the cover 20 includes the second positioning parts 282 including the two protrusions opposed to each other. Therefore, the present configuration enables to stably restrict displacement of the cover 20 relative to the driving unit 10 in the Y direction.

OTHER EMBODIMENT

The positioning part 80 is not limited to be projected in the protruding direction of the adhesive protrusion 21 in which the adhesive protrusion 21 protrudes from the cover 20. For example, the positioning part 80 may be an opening to which a portion that protrudes from the driving unit 10 is inserted to implement the positioning. In this configuration, both the driving unit 10 and the cover 20 may be equipped with magnets respectively.

In a configuration that ensures its sealing property by using an annular tightly contact member such as an O-ring, the O-ring needs to be tightly in contact with a portion that requires a high sealing property. Therefore, this configuration requires to enable the O-ring to be tightly in contact with the portion. Furthermore, in the configuration that ensures its sealing property by using an O-ring, displacement of the O-ring needs to be restricted when the device is assembled. Therefore, the configuration is required to restrict displacement of the O-ring. To the contrary, in a configuration in which its sealing property is ensured by using an adhesive, the adhesive, which is soft before being solidified, traces the adhesive surface. Therefore, in this case, an additional configuration that cause the adhesive to be tightly in contact with the adhesive surface and to restrict its displacement need not be provided. For these reasons, the configuration enables to ensure the sealing property with a simple structure by using adhesive, and thereby to enable to design the driving device 1 to be thin and/or small.

In a configuration that ensures the sealing property by using a tightly contact member such as an O-ring, an object that is in contact with the O-ring defines the adhesive surface. Therefore, this configuration requires to use an O-ring that is large in size or to use multiple O-rings in order to ensure the sealing surface to be large. To the contrary, the present configuration, which ensures the sealing surface by using the adhesive, enables to easily ensure the sealing surface to be large by, for example, providing a protrusion and a recess on the sealing surface.

The disclosure in this specification and drawings is not limited to the exemplified embodiments. The disclosure includes the exemplified embodiments and variations thereof by those skilled in the art based thereon. For example, the disclosure is not limited to the combinations of components and/or elements shown in the embodiments. The disclosure may be be implemented in various combinations. The disclosure may have additional parts that can be added to the embodiments. The disclosure includes those in which parts and/or elements of the embodiments are omitted. The disclosure encompasses the replacement or combination of components and/or elements between one embodiment and another. The disclosed technical scope is not limited to the description of the embodiments. It should be understood that some disclosed technical ranges are indicated by description of claims, and includes every modification within the equivalent meaning and the scope of description of claims.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure. While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A driving device comprising:
a driving unit having an adhered recess that is in a loop shape;
a cover having an adhered protrusion that is in a loop shape and is opposed to the adhered recess;
an adhesive sealing compound adhering the adhered recess and the adhered protrusion to each other continually in a loop shape; and
a positioning part configured to position the adhered protrusion relative to the adhered recess, wherein
the driving unit includes an outer periphery protrusion and an inner periphery protrusion,
the inner periphery protrusion is closer to a center of the driving unit than the outer periphery protrusion,
the outer periphery protrusion and the inner periphery protrusion protrude from the driving unit and are opposed to each other to form the adhered recess therebetween,
the inner periphery protrusion is in contact with both the positioning part and the adhered protrusion and is interposed between the positioning part and the adhered protrusion,
the adhered protrusion and the positioning part are opposed to each other and are distant from each other, and
a distance between the adhered protrusion and the positioning part is the same as a width of the inner periphery protrusion.

2. The driving device according to claim 1, wherein the positioning part includes:
a first positioning part configured to position the adhered protrusion relative to the adhered recess in one direction that is orthogonal to a protruding direction in which the adhered protrusion protrudes; and
a second positioning part configured to position the adhered protrusion relative to the adhered recess in a remaining one direction that is orthogonal to both the protruding direction of the adhered protrusion and the one direction in an orthogonal coordinate system.

3. The driving device according to claim 1, wherein
the positioning part protrudes from the cover in a direction along a protruding direction of the adhered protrusion, and
a protrusion amount of the positioning part is larger than a protrusion amount of the adhered protrusion.

4. The driving device according to claim 3, wherein the cover pinches a part of the driving unit between the adhered protrusion and the positioning part.

5. The driving device according to claim 1, wherein the positioning part includes an inclined part such that the farther from the adhered protrusion, the larger a protrusion amount of the inclined part is.

6. The driving device according to claim 1, wherein the cover has an outer surface protrusion that protrudes from an outer surface of the cover and is opposed to an end of the driving unit.

7. The driving device according to claim 6, wherein the adhesive sealing compound is opaque.

8. The driving device according to claim 1, wherein
the driving unit includes a frame having a tubular shape with a bottom and made of a metallic material, and
each of the outer periphery protrusion and the inner periphery protrusion is a part of the frame.

9. The driving device according to claim 1, wherein the positioning part protrudes from the cover in a direction along a protruding direction in which the adhered protrusion protrudes.

10. A driving device comprising:
a driving unit having an adhered recess that is in a loop shape;
a cover having an adhered protrusion that is in a loop shape and is opposed to the adhered recess;
an adhesive sealing compound adhering the adhered recess and the adhered protrusion to each other continually in a loop shape; and
a positioning part configured to position the adhered protrusion relative to the adhered recess, wherein
the driving unit includes an outer periphery protrusion and an inner periphery protrusion,
the inner periphery protrusion is closer to a center of the driving unit than the outer periphery protrusion,
the outer periphery protrusion and the inner periphery protrusion protrude from the driving unit and are opposed to each other to form the adhered recess therebetween,
the inner periphery protrusion is in contact with both the positioning part and the adhered protrusion and is interposed between the positioning part and the adhered protrusion,
the adhered protrusion and the positioning part protrude from the cover and form a bottom surface therebetween, and
an entirety of the bottom surface is in contact with an entirety of an end surface of the inner periphery protrusion.

11. A driving device comprising:
a driving unit having an adhered recess that is in a loop shape;
a cover having an adhered protrusion that is in a loop shape and is opposed to the adhered recess;
an adhesive sealing compound adhering the adhered recess and the adhered protrusion to each other continually in a loop shape; and
a positioning part configured to position the adhered protrusion relative to the adhered recess, wherein
the driving unit includes an outer periphery protrusion and an inner periphery protrusion,
the inner periphery protrusion is closer to a center of the driving unit than the outer periphery protrusion,
the outer periphery protrusion and the inner periphery protrusion protrude from the driving unit and are opposed to each other to form the adhered recess therebetween,
the inner periphery protrusion is in contact with both the positioning part and the adhered protrusion and is interposed between the positioning part and the adhered protrusion, and
the adhered protrusion is kept in contact to a surface of the inner periphery protrusion by the positioning part.

* * * * *